(12) United States Patent
Knudsen

(10) Patent No.: US 11,773,832 B1
(45) Date of Patent: Oct. 3, 2023

(54) SYSTEM AND METHOD FOR SEALING FLUID PASSAGES IN RECIPROCATING ENGINE

(71) Applicant: INNIO Waukesha Gas Engines Inc., Waukesha, WI (US)

(72) Inventor: Julian R. Knudsen, North Prairie, WI (US)

(73) Assignee: Innio Waukesha Gas Engines Inc., Waukesha, WI (US)

(*) Notice: Subject to any disclaimer, the term of this patent is extended or adjusted under 35 U.S.C. 154(b) by 15 days.

(21) Appl. No.: 17/686,217

(22) Filed: Mar. 3, 2022

(51) Int. Cl.
  F04B 1/0448 (2020.01)
  F04B 1/0439 (2020.01)
  F04B 1/0408 (2020.01)

(52) U.S. Cl.
  CPC .......... *F04B 1/0448* (2013.01); *F04B 1/0408* (2013.01); *F04B 1/0439* (2013.01)

(58) Field of Classification Search
  CPC .............................. F16L 21/08; F16L 37/0927
  See application file for complete search history.

(56) References Cited

U.S. PATENT DOCUMENTS

| | | | | |
|---|---|---|---|---|
| 3,815,940 A * | 6/1974 | Luckenbill | .......... | F16L 37/0925 285/423 |
| 6,109,485 A * | 8/2000 | Amidzich | ............ | B67D 1/0832 137/212 |
| 9,914,085 B2 * | 3/2018 | Hasenfratz | ............ | B01D 46/64 |
| 2004/0007874 A1 * | 1/2004 | Minami | ................ | F16L 19/075 285/355 |
| 2009/0320953 A1 * | 12/2009 | Fletcher | .................. | B32B 15/18 138/148 |
| 2011/0241340 A1 * | 10/2011 | Okada | ................... | F16L 15/004 285/333 |
| 2012/0280497 A1 * | 11/2012 | Holmes, IV | ........ | F16L 37/0925 285/379 |
| 2013/0220069 A1 * | 8/2013 | Flender | ............... | F01L 1/34413 74/568 R |
| 2014/0165370 A1 * | 6/2014 | Stahl | ........................ | F16B 39/28 29/700 |
| 2021/0215287 A1 * | 7/2021 | Wells | ...................... | F16L 47/12 |
| 2022/0349503 A1 * | 11/2022 | Durieux | .................. | F16L 37/02 |

* cited by examiner

*Primary Examiner* — John Kwon
(74) *Attorney, Agent, or Firm* — Fletcher Yoder, P.C.

(57) ABSTRACT

A seal assembly between first and second passages of an engine block and a gear box assembly of a reciprocating engine. The seal assembly includes a conduit having a first end portion disposed inside of the first fluid passage and a second end portion disposed outside of the first fluid passage in fluid communication with the second passage of the gear box assembly. The seal assembly includes a collar disposed about the second end portion of the conduit, and a radial sealing interface disposed between an outer conduit surface of the conduit and an inner collar surface of the collar, wherein the radial sealing interface supports a first radial seal. The seal assembly includes an axial sealing interface disposed between an axial face of the collar and an opposing axial face of the gear box assembly, wherein the axial sealing interface supports a face seal.

20 Claims, 8 Drawing Sheets

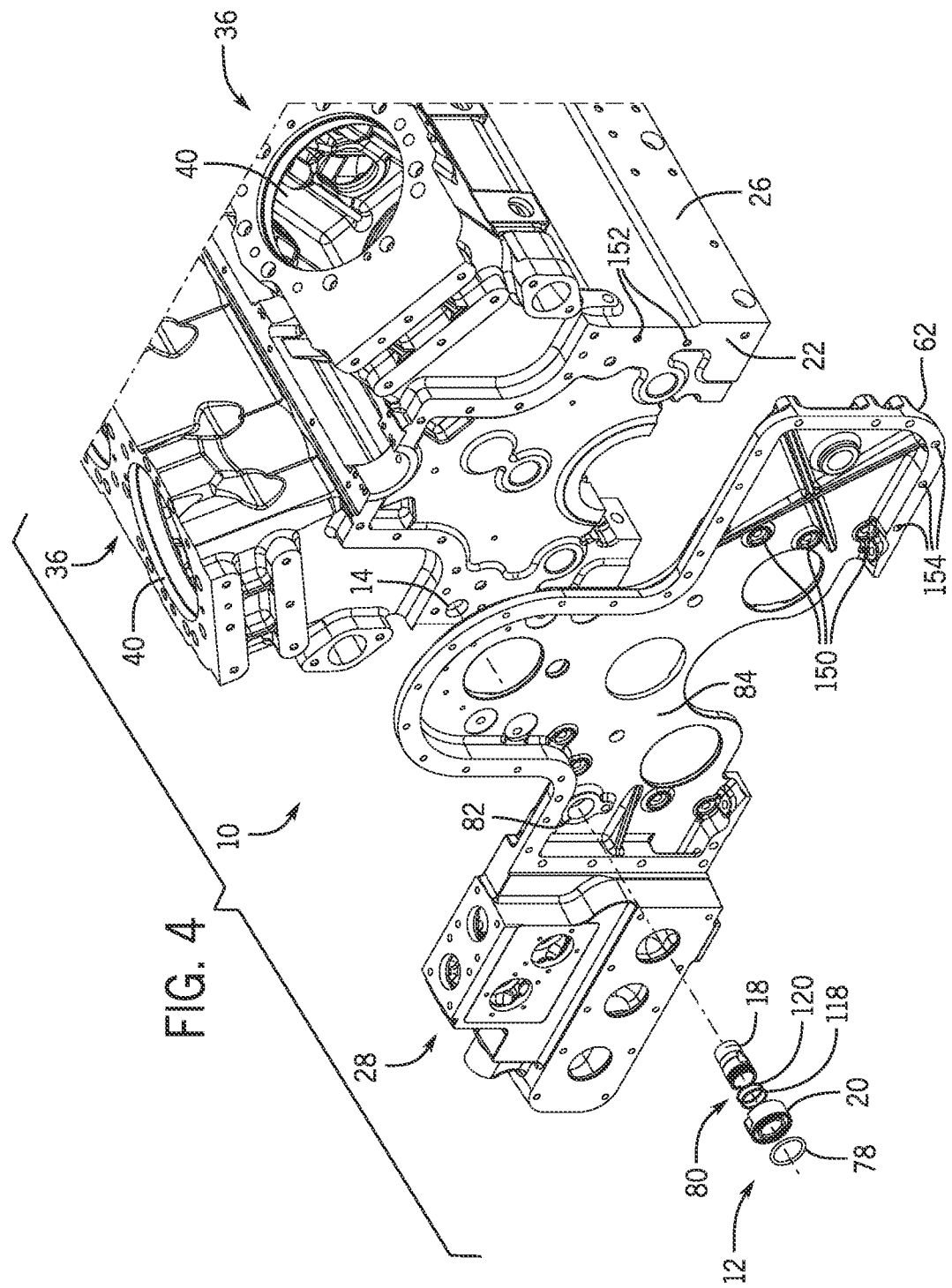

SYSTEM AND METHOD FOR SEALING FLUID PASSAGES IN RECIPROCATING ENGINE

BACKGROUND

The subject matter disclosed herein relates to reciprocating engines and associated seal assemblies.

A reciprocating engine may include a plurality of pistons disposed in respective cylinders in an engine block. Various parts of the reciprocating engine may be coupled together and sealed via gaskets. Unfortunately, the gaskets are generally subjected to elevated temperatures and pressures. For example, a gasket may be susceptible to leakage along a fluid passage, such as a lubricant passage. More specifically, the fluid passage (e.g., lubricant passage) may extend directly across an interface of the parts having the gasket, such that the gasket is directly exposed to the fluid (e.g., lubricant). Accordingly, a need exists to improve sealing across the interface of parts, for example, to help protect the gasket at the interface.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes a seal assembly configured to mount between a first passage of an engine block and a second passage of a gear box assembly of a reciprocating engine. The seal assembly includes a conduit having a first end portion configured to be disposed inside of the first fluid passage and a second end portion configured to be disposed outside of the first fluid passage in fluid communication with the second passage of the gear box assembly. The seal assembly includes a collar disposed about the second end portion of the conduit. The seal assembly includes a radial sealing interface disposed between an outer conduit surface of the conduit and an inner collar surface of the collar, wherein the radial sealing interface is configured to support a first radial seal. The seal assembly includes an axial sealing interface disposed between an axial face of the collar and an opposing axial face of the gear box assembly, wherein the axial sealing interface is configured to support a face seal.

In certain embodiments, a method includes forming a conduit of a seal assembly, wherein a first end portion of the conduit is configured to be disposed inside of a first fluid passage of an engine block of a reciprocating engine, wherein a second end portion of the conduit is configured to be disposed outside of the first fluid passage in fluid communication with a second passage of a gear box assembly of the reciprocating engine. The method includes forming a collar of the seal assembly, wherein the collar is configured to be disposed about the second end portion of the conduit. The method includes forming a radial sealing interface between an outer conduit surface of the conduit and an inner collar surface of the collar, wherein the radial sealing interface is configured to support a first radial seal. The method includes forming an axial sealing interface between an axial face of the collar and an opposing axial face of the gear box assembly, wherein the axial sealing interface is configured to support a face seal.

In certain embodiments, a method includes sealing, via a seal assembly, between a first passage of an engine block and a second passage of a gear box assembly of a reciprocating engine. The seal assembly includes a conduit having a first end portion disposed inside of the first fluid passage and a second end portion disposed outside of the first fluid passage in fluid communication with the second passage of the gear box assembly. The seal assembly includes a collar disposed about the first radial seal along the second end portion of the conduit. The seal assembly includes a radial sealing interface disposed between an outer conduit surface of the conduit and an inner collar surface of the collar, wherein the radial sealing interface is configured to support a first radial seal. The seal assembly includes an axial sealing interface disposed between an axial face of the collar and an opposing axial face of the gear box assembly, wherein the axial sealing interface is configured to support a face seal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a partial exploded perspective view of an embodiment of the reciprocating engine of FIG. 1, further illustrating the seal assembly and a gear housing of the gear box assembly exploded relative to the engine block.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed in detail below, embodiments of a seal assembly include a conduit and a collar movably coupled together along a radial sealing interface to facilitate sealing across an interface having a gasket between components of a reciprocating engine (e.g., an engine block and a gear box assembly). The conduit extends directly across the interface to form a barrier at the interface, thereby blocking leakage in an outward radial direction into the gasket. The radial sealing interface may include one or more radial seals (e.g., elastomeric O-rings) between the conduit and the collar, such that the collar and the conduit can move axially relative to one another. The collar also includes an axial sealing interface having one or more face seals, which are configured to seal against an opposing axial surface of a part of the reciprocating engine (e.g., a gear cover of the gear box assembly). The seal assembly is configured to improve sealing at the interface having the gasket, and may help increase the useful life of the gasket. Additionally, the seal assembly may be part of a retrofit kit configured to enhance sealing in existing reciprocating engines. Various aspects of the sealing system and the reciprocating engine are described in further detail below with reference to the drawings.

Figure 1:
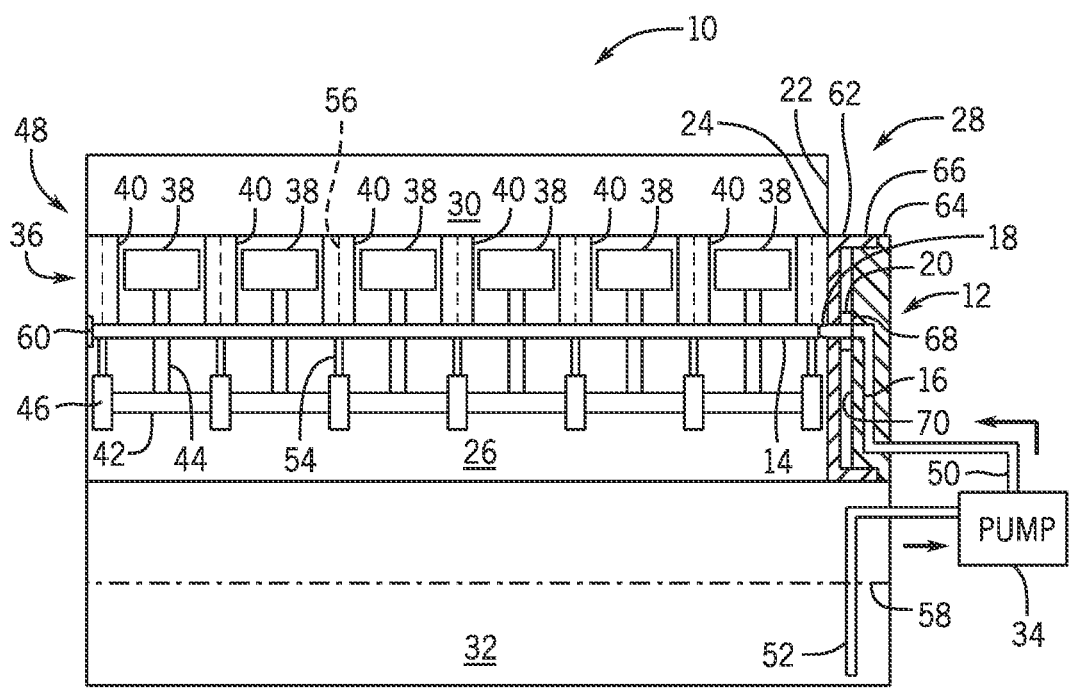
FIG. 1 is a schematic of a reciprocating engine having a seal assembly disposed between fluid passages in different components (e.g., an engine block and a gear box assembly) of a reciprocating engine.

FIG. 1 is a schematic of a reciprocating engine 10 having a seal assembly 12 disposed between fluid passages 14 and 16 in different components of a reciprocating engine 10. As illustrated, the seal assembly 12 includes a conduit 18 disposed at least partially in the fluid passage 14, and a collar 20 disposed circumferentially about the conduit 18 and in fluid communication with the fluid passage 16. As discussed in further detail below, the seal assembly 12 is configured to provide sealing across an interface 22 having a gasket 24 between the different components of the reciprocating engine 10, thereby helping to protect the gasket 24 and reduce the possibility of leakage.

The reciprocating engine 10 includes an engine block 26, a gear box assembly 28, one or more cylinder heads 30 (e.g., supporting intake and exhaust valves), an oil pan 32, and a pump 34. In certain embodiments, the reciprocating engine 10 may include a single cylinder head 30 or a pair of cylinder heads 30. The engine block 26 includes a plurality of piston cylinder assemblies 36 each having a piston 38 disposed in a cylinder 40, wherein each piston 38 is configured to reciprocate axially within the respective cylinder 40. In certain embodiments, the reciprocating engine 10 may include 1, 2, 3, 4, 5, 6, 7, 8, 9, 10, 11, 12, or more piston cylinder assemblies 36 associated with each cylinder head 30. For each piston cylinder assembly 36, a combustion chamber is defined between the cylinder head 30, the piston 38, and the cylinder 40. In operation, the reciprocating engine 10 supplies fuel and air into each combustion chamber to generate a fuel air mixture in the combustion chamber, and then ignites the fuel air mixture via an ignition device (e.g., a spark plug) to generate hot combustion gases. Each piston 38 is coupled to a crankshaft 42 via a connecting rod 44. Accordingly, the hot combustion gases drive movement of each piston 38 in the respective cylinder 40, thereby driving the connecting rod 44 to rotate the crankshaft 42 in the engine block 26. The crankshaft 42 is rotationally supported by a plurality of bearings 46 in the engine block 26. For example, the reciprocating engine 10 may include one or more bearings 46 disposed between each adjacent pair of piston cylinder assemblies 36 and one or more bearings 46 disposed at opposite distal end portions of the crankshaft 42.

The engine block 26 further includes an internal fluid circuit 48 configured to circulate and distribute a fluid throughout the engine block 26 and the one or more cylinder heads 30. In the illustrated embodiment, the internal fluid circuit 48 is an internal lubricant (e.g., oil) fluid circuit 48 configured to flow a lubricant (e.g., oil) through the reciprocating engine 10. However, in some embodiments, the internal fluid circuit 48 may include a coolant circuit, such as a water-based coolant circuit. In the illustrated embodiment of FIG. 1, the internal fluid circuit 48 includes the fluid passage 14 coupled to the fluid passage 16, such that the seal assembly 12 is disposed along the internal fluid circuit 48. The pump 34 is coupled to the fluid passage 16 via a supply conduit 50, and the pump 34 is coupled to a suction conduit 52 extending into the oil pan 32. The fluid passage 14 extends through the engine block 26 and connects with a plurality of additional fluid passages, such as fluid passages 54 extending to the bearings 46 and fluid passages 56 extending to the one or more cylinder heads 30. Accordingly, the fluid passages 54 are configured to distribute a fluid (e.g., lubricant such as oil) to each of the bearings 46 for lubrication, while the fluid passages 56 are configured to distribute the fluid into the one or more cylinder heads 30 for lubrication of intake valves, exhaust valves, etc.

In operation, the pump 34 is configured to draw a fluid 58, such as a lubricant or oil, from the oil pan 32 through the suction conduit 52, and then supply the fluid 58 into the fluid passage 16 via the supply conduit 50. In the illustrated embodiment, the fluid passage 16 is disposed in the gear box assembly 28. Accordingly, the pump 34 flows the fluid 58 through the supply conduit 50 into the fluid passage 16 in the gear box assembly 28, and then the fluid 58 flows through the seal assembly 12 into the fluid passage 14 in the engine block 26. Upon reaching the engine block 26, the fluid 58 then flows through the various fluid passages 54 to the bearings 46 and the fluid 58 flows through the various fluid passages 56 to the one or more cylinder heads 30. The fluid 58 eventually returns to the oil pan 32, where the fluid 58 is then recirculated back through the internal fluid circuit 48 via the pump 34.

In the illustrated embodiment, the fluid passage 14 is an axial fluid passage extending lengthwise along the engine block 26. A plug 60 is coupled to the engine block 26 to seal the fluid passage 14 at one axial end of the engine block 26, while the seal assembly 12 is disposed at the opposite axial end of the engine block 26 adjacent the gear box assembly 28. The gear box assembly 28 includes a plurality of gears (see FIG. 8) disposed between a gear housing 62 and a gear cover 64, which are coupled together via a plurality of removable fasteners (e.g., threaded fasteners or bolts). The gear housing 62 is coupled to the engine block 26 along the interface 22 having the gasket 24. For example, the gear housing 62 may be coupled to the engine block 26 via a plurality of removable fasteners (e.g., threaded fasteners or bolts). The gasket 24 is disposed along the interface 22 to provide sealing between the gear housing 62 and the engine block 26. Together, the gear housing 62 and the gear cover 64 define an internal gear chamber 66 housing a plurality of gears (see FIG. 8). In the illustrated embodiment, the fluid passage 16 extends through a wall portion of the gear cover 64 from the supply conduit 50 to the seal assembly 12.

The seal assembly 12 has the conduit 18 extending partially into the fluid passage 14 in the engine block 26. The collar 20 is disposed about a portion of the conduit 18 within the gear chamber 66, wherein the collar 20 also is disposed axially against an interior of the gear cover 64. As discussed in further detail below, the conduit 18 may be threaded into the fluid passage 14, the collar 20 may be sealed about the conduit 18 via one or more radial seals, and the collar 20 may have one or more face seals disposed between an axial face 68 of the collar 20 and an opposing axial face 70 of the gear cover 64. The conduit 18 extends through the gear housing 62 across the interface 22 having the gasket 24, such that the conduit 18 axially protrudes from opposite sides of the gear housing 62. In this configuration, the conduit 18 directly blocks fluid at the interface 22 having the gasket 24, thereby helping to reduce the possibility of leakage at the interface 22 between the gear box assembly 28 and the engine block 26. Additional details of the seal assembly 12 are discussed below.

Figure 2:
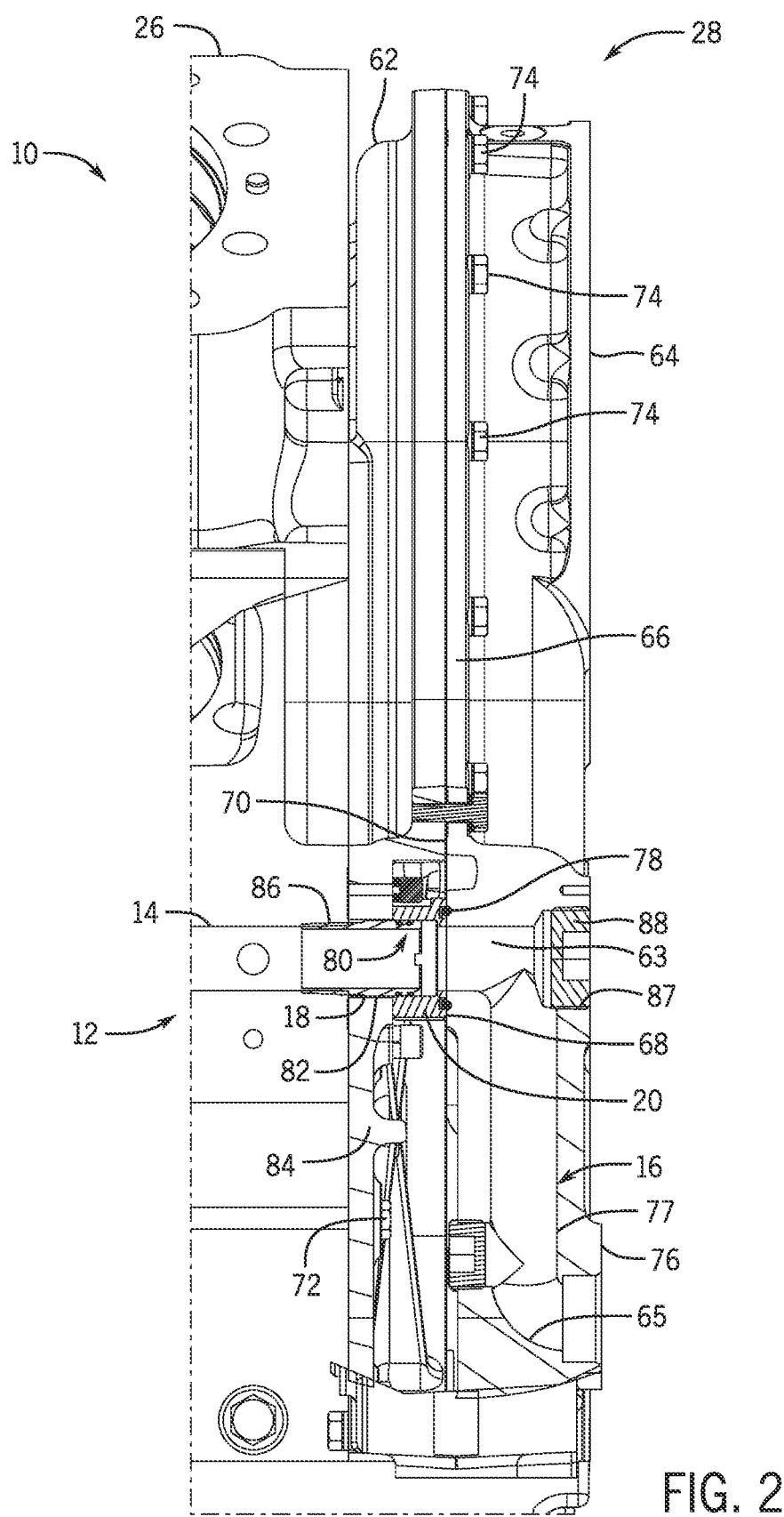
FIG. 2 is a partial cross-sectional side view of the reciprocating engine of FIG. 1, further illustrating details of the gear box assembly coupled to the engine block, wherein the seal assembly is disposed in the gear box assembly.

FIG. 2 is a partial cross-sectional side view of the reciprocating engine 10 of FIG. 1, further illustrating details of the gear box assembly 28 coupled to the engine block 26. As illustrated, the gear box assembly 28 has the gear housing 62 removably coupled to the engine block 26 via a plurality of fasteners 72, such as threaded fasteners or bolts. Similarly, the gear cover 64 is removably coupled to the gear housing 62 via a plurality of fasteners 74, such as threaded fasteners or bolts. The gear cover 64 has the fluid passage 16 extending from an outer surface 76 to the opposing axial face 68 adjacent the collar 20 of the seal assembly 12. As illustrated, the fluid passage 16 in the gear cover 64 includes a bend or turning passage 63 through the axial face 70 adjacent the seal assembly 12, a bend or turning passage 65 through the outer surface 76, and an intermediate passage (e.g., straight passage) 77 extending between the turning passages 63 and 65. At the turning passage 63, the fluid passage 16 also may include an access port or opening 87 sealed with a plug 88, such as a threaded plug. The access opening 87 and the plug 88 may be coaxial with the seal assembly 12 as illustrated in FIG. 2.

At the opposing axial face 70 of the gear cover 64, the axial face 68 of the collar 20 includes a face seal 78 configured to seal between the axial face 68 and opposing axial face 70. The face seal 78 may be an annular face seal, such as an elastomeric O-ring. The collar 20 is disposed circumferentially about the conduit 18 within the gear chamber 66 of the gear box assembly 28. In addition, the seal assembly 12 includes one or more radial seals 80 disposed between the collar 20 and the conduit 18, thereby providing sealing between the conduit 18 and the collar 20 while also enabling relative axial movement between the conduit 18 and the collar 20. The conduit 18 extends through a bore 82 in a wall 84 of the gear housing 62, such that the conduit 18 partially axially protrudes from the wall 84 into the fluid passage 14 in the engine block 26 and partially axially protrudes from the wall 84 into the gear chamber 66 having the collar 20. In the illustrated embodiment, the conduit 18 may be coupled to the fluid passage 14 via one or more connections 86, such as a threaded connection, a press fit connection, a retainer ring, or any combination thereof. In the illustrated embodiment, as discussed in further detail below, the connection 86 includes a threaded connection between threads on the conduit 18 and corresponding threads within the fluid passage 14.

Figure 3:
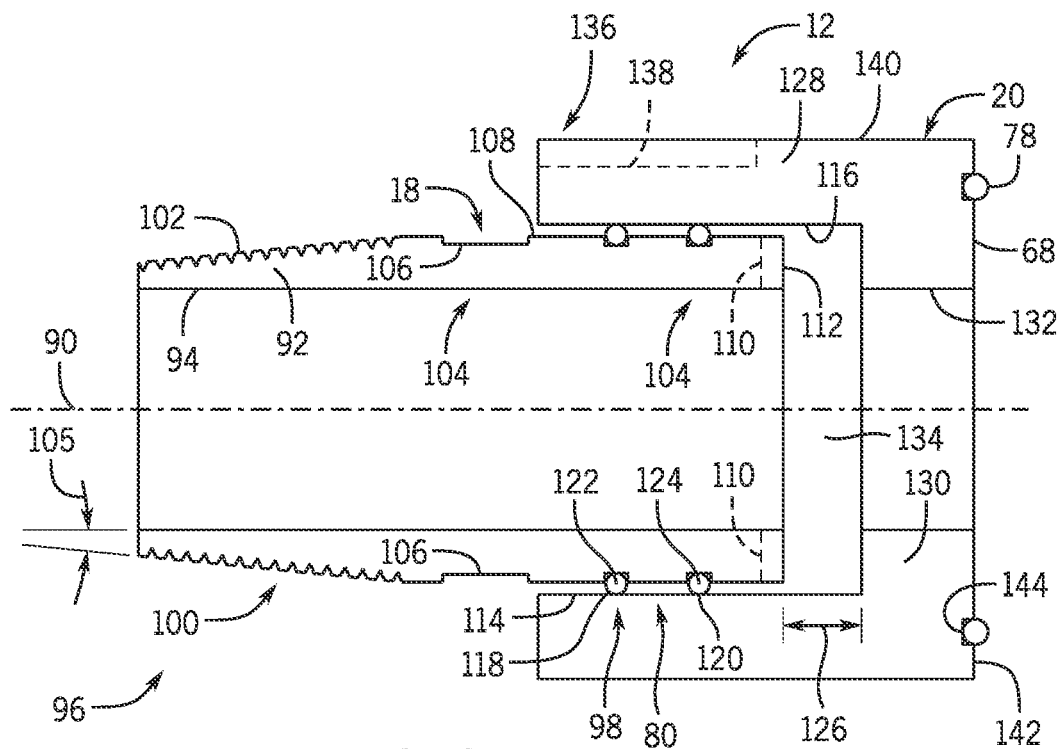
FIG. 3 is a schematic cross-sectional side view of an embodiment of the seal assembly of FIGS. 1 and 2, further illustrating details of a conduit and a collar of the seal assembly disposed along a central axis aligned with the fluid passage in the engine block.

FIG. 3 is a schematic cross-sectional side view of an embodiment of the seal assembly 12 of FIGS. 1 and 2, further illustrating details of the conduit 18 and the collar 20 disposed along a central axis 90 aligned with the fluid passage 14 in the engine block 26. As illustrated, the conduit 18 has a sidewall 92 disposed circumferentially about the central axis 90 to define a central bore 94, such as a central fluid passage (e.g., lubricant or oil passage). The sidewall 92 may be an annular sidewall 92 extending between opposite end portions 96 and 98. The end portion 96 may include a tapered annular surface 100 (e.g., frustoconical surface) having threads 102 configured to mate with corresponding threads in the fluid passage 14 at the connection 86 illustrated in FIG. 2. In the illustrated embodiment, the threads 102 follow the tapered annular surface 100 at an angle 105. For example, the angle 105 may be greater than or equal to 1, 2, 3, 4, 5, 6, 7, 8, 9, 10, or more degrees relative to the central axis 90. The angle 105 of the threads 102 along the tapered annular surface 100 may be configured to facilitate coupling and sealing at the connection 86 with the engine block 26. For example, the threads 102 along the tapered annular surface 100 may be described as pipe threads having the angle 105.

A torque tool is configured to couple with the conduit 18 at one or more torque tool interfaces 104 to rotate and drive the conduit 18 into the fluid passage 14 at the connection 86, particularly by driving the threads 102 into corresponding threads in the fluid passage 14. Due to the angle 105 along the tapered annular surface 100, the threads 102 on the conduit 18 progressively wedge fit into the corresponding threads in the fluid passage 14 of the engine block 26, such that an increasingly greater amount of torque is needed to thread the conduit 18 into the fluid passage 14. The torque tool may continue driving the conduit 18 into the fluid passage 14 until the applied torque reaches a torque threshold. Accordingly, the conduit 18 may include one or more torque tool interfaces 104 configured to apply torque from the torque tool onto the conduit 18 when rotating the conduit 18 to drive the threads 102 into the fluid passage 14 and the engine block 26.

In certain embodiments, the torque tool interface 104 may include a plurality of flats 106 disposed along an outer conduit surface 108 of the conduit 18. For example, the flats 106 may include one or more pairs of flats disposed on diametrically opposite sides of the outer conduit surface 108 to facilitate interaction with a corresponding torque tool. Additionally, the torque tool interface 104 may include one or more slots 110 disposed in an axial end surface 112 of the conduit 18 at the end portion 98. For example, the slots 110 may be recessed into the axial end surface 112 and oriented radially inwardly toward the central axis 90 at one or more angular positions about the central axis 90. Similar to the flats 106, the slots 110 may be configured to interact with a torque tool to help drive the conduit 18 rotationally to drive the threads 102 into the corresponding threads in the fluid passage 14 at the connection 86.

The collar 20 is disposed about the end portion 98 of the conduit 18 along a radial sealing interface 114. The radial sealing interface 114 is disposed along the outer conduit surface 108 of the conduit 18 and an inner collar surface 116 of the collar 20. The radial sealing interface 114 includes the one or more radial seals 80, such as radial seals 118 and 120. The radial seals 80, including the radial seals 118 and 120, may be disposed in radial seal grooves disposed in the conduit 18, the collar 20, or a combination thereof. In the illustrated embodiment, the radial seals 118 and 120 are disposed in radial seal grooves 122 and 124 disposed in the outer conduit surface 108 of the conduit 18. However, one or both of the illustrated radial seal grooves 122 and 124 may be disposed in the inner collar surface 116 of the collar 20. In some embodiments, the radial seals 80 may include any number of radial seals, such as 1, 2, 3, 4, 5, 6, 7, 8, 9, 10, or more radial seals along the radial sealing interface 114.

The radial sealing interface 114, the outer conduit surface 108, the inner collar surface 116, and the radial seals 80 may be annular, such that the radial sealing interface 114 can maintain a seal between the conduit 18 and the collar 20 during axial movement and/or rotational movement between the conduit 18 and the collar 20. For example, the collar 20 and the conduit 18 may be configured to move axially along the central axis 90 over an axial distance 126 while maintaining sealing along the radial sealing interface 114 via the radial seals 80. The distance 126 may be at least equal to or greater than 1, 2, 3, 4, 5, 6, 7, 8, 9, 10, or more millimeters.

The collar 20 is disposed circumferentially about the central axis 90, wherein the collar 20 includes a sidewall 128 and an end wall 130. The sidewall 128 extends circumferentially about the central axis 90 to define the inner collar surface 116, while the end wall 130 extends circumferentially about the central axis 90 to define a central bore 132 (e.g., a central fluid passage). The central bore 132 of the collar 20 and the central bore 94 of the conduit 18 are generally aligned with one another along the central axis 90 and are in fluid communication with one another. Thus, fluid flow can pass through the central bore 132, a chamber 134 along the distance 126, and the central bore 94 between the fluid passages 14 and 16 of the engine block 26 and the gear box assembly 28, respectively.

The sidewall 128 of the collar 20 may include one or more axial guides 136 configured to guide the collar 20 in an axial direction along the central axis 90 during movement of the collar 20 relative to the conduit 18. For example, the one or more axial guides 136 may include an axial slot 138, which may be configured to mate with or move along a corresponding axial guide in the gear box assembly 28. For example, the axial slot 138 may receive a portion of a fastener (e.g., a threaded fastener or bolt) in the gear box assembly 28. The axial guide 136 is disposed in an outer collar surface 140 of the collar 20, wherein the axial slot 138 may extend radially into the outer collar surface 140 along an axial distance along the sidewall 128 of the collar 20.

The end wall 130 of the collar 20 includes the axial face 68 having the face seal 78. In certain embodiments, the face seal 78 is disposed along an axial sealing interface 142 between the axial face 68 of the collar 20 and the opposing axial face 70 of the gear cover 64. Accordingly, the axial sealing interface 142 may include one or more of the face seals 78 recessed into the axial face 68, the opposing axial face 70, or a combination thereof. For example, each of the face seals 78 may be disposed in a face seal groove 144 disposed in the axial face 68 and/or the opposing axial face 70. In the illustrated embodiment, the axial sealing interface 142 has one of the face seals 78 disposed in the face seal groove 144 disposed in the axial face 68 of the collar 20. However, the axial sealing interface 142 may include one or more face seals 78 disposed in face seal grooves 144 in the opposing axial face 70 of the gear cover 64.

In the illustrated embodiment, the seal assembly 12 is an annular seal assembly having an annular shaped conduit 18, an annular shaped collar 20, and annular shaped components. For example, the central bore 94, the outer conduit surface 108, the radial sealing interface 114, the radial seals 80, the sidewall 128, the face seal 78, and associated components may have annular shapes disposed circumferentially about the central axis 90. The axial face 68 also may be described as a planar surface that is perpendicular to the central axis 90, while the opposing axial face 70 also may be described as a planar surface perpendicular to the central axis 90.

In operation, the sidewall 92 of the conduit 18 extends across the interface 22 having the gasket 24, thereby blocking any fluid leakage directly into the gasket 24. The end portion 96 having the threads 102 is disposed in the fluid passage 14 in the engine block 26, while the end portion 98 of the conduit 18 and the collar 20 are disposed in the gear chamber 66 of the gear box assembly 28. The radial sealing interface 114 maintains sealing between the conduit 18 and the collar 20, while the axial sealing interface 142 maintains sealing between the collar 20 and the gear cover 64. The axial distance 126 (e.g., axial play while maintaining sealing at the radial sealing interface 114) also may facilitate sealing between the fluid passages 14 and 16 while accommodating movement, variances in dimensions, or other issues. In certain embodiments, the axial distance 126 (e.g., axial play while maintaining sealing at the radial sealing interface 114) may enable the conduit 18 to extend to various depths into the fluid passage 14 depending on the particular reciprocating engine 10, the threaded engagement via the threads 102, the torque applied to the conduit 18 via the torque tool at the torque tool interface 104, or any combination thereof. Additionally, in certain embodiments, the axial distance 126 (e.g., axial play while maintaining sealing at the radial sealing interface 114) may enable the conduit 18 to extend into the gear box assembly 28 (e.g., into the gear housing 62) to various distances while the collar 20 maintains the axial sealing interface 142 with the gear cover 64. The axial distance 126 (e.g., axial play while maintaining sealing at the radial sealing interface 114) also may enable the seal assembly 12 to maintain sealing across the interface 22 between the fluid passages 14 and 16 while the components of the reciprocating engine 10 (e.g., engine block 26, gear housing 62, and/or gear cover 64) may move relative to one another due to thermal expansion and/or contraction, adjustments of the components, vibration of the components, replacement of one of the components, or any combination thereof.

Figure 8:
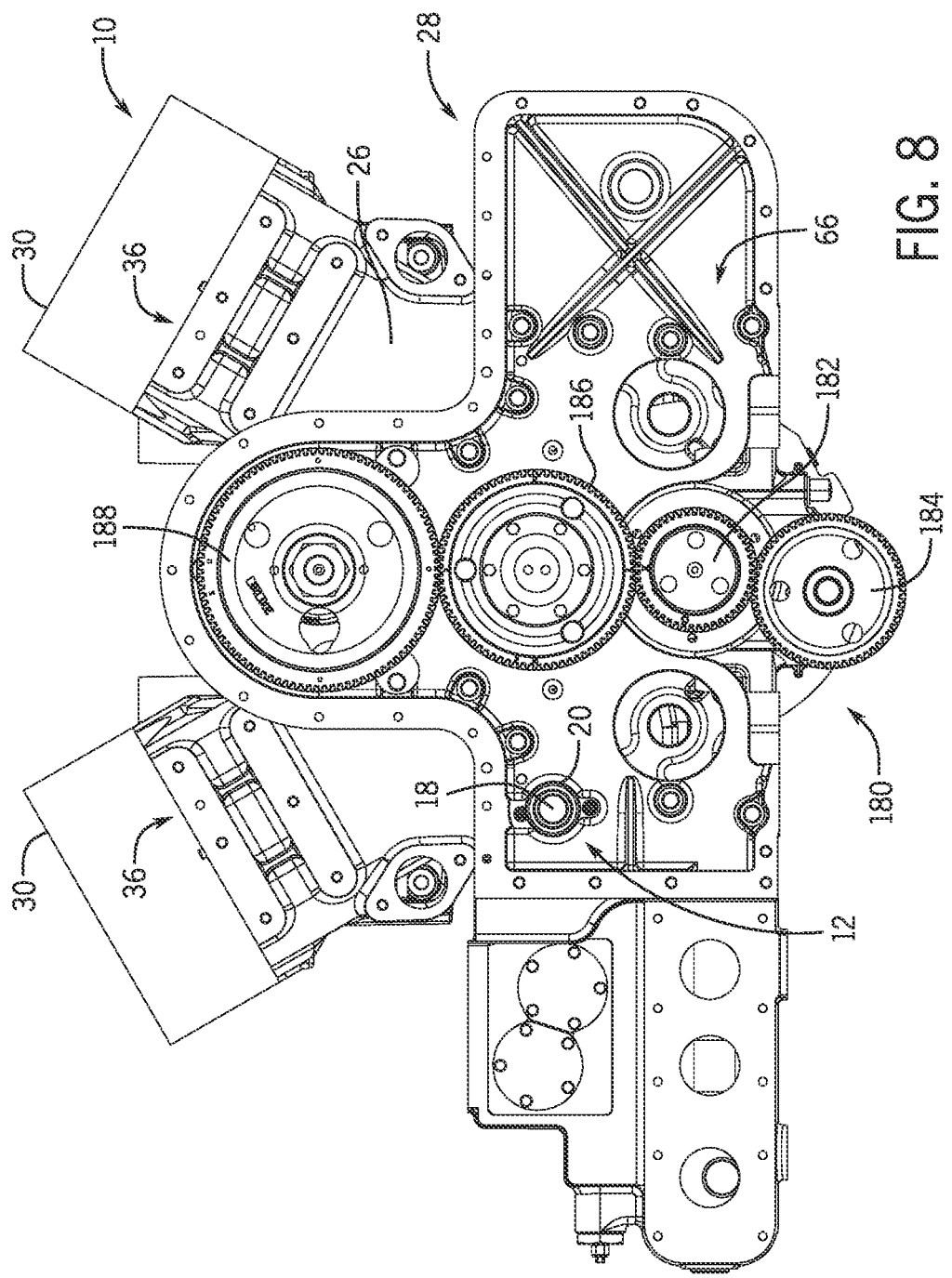
FIG. 8 is a front view of an embodiment of the reciprocating engine of FIG. 1, further illustrating the seal assembly disposed in the gear box assembly mounted to the engine block, prior to installation of the gear cover over the gear housing.

FIG. 4 is a partial exploded perspective view of an embodiment of the reciprocating engine 10 of FIG. 1, further illustrating the seal assembly 12 and the gear housing 62 of the gear box assembly 28 exploded relative to the engine block 26. As illustrated, the gear housing 62 is exploded from the interface 22 with the engine block 26. The gear housing 62 is configured to couple to the engine block 26 at the interface 22 with the gasket 24 as shown in FIG. 1, and the gear housing 62 may be coupled to the engine block 26 via a plurality of fasteners (e.g., threaded fasteners or bolts) extending through fastener receptacles 150 in the gear housing 62 into corresponding fastener receptacles 152 in the engine block 26. Similarly, the gear housing 62 includes a plurality of fastener receptacles 154 configured to receive fasteners (e.g., threaded fasteners or bolts) to couple with the gear cover 64. The seal assembly 12 includes each of the components described above with reference to FIGS. 1-3, such as the conduit 18, the collar 20, the radial seals 80, and the face seal 78. The conduit 18 is configured to extend through the bore 82 in the wall 84 of the gear housing 62 and thread into the fluid passage 14 in the engine block 26. The collar 20 is configured to subsequently surround a portion of the conduit 18 within the gear housing 62 (e.g., on an opposite side of the wall 84 relative to the interface 22 with the engine block 26). Although FIG. 4 does not show the gears within the gear box assembly 28, the gear box assembly 28 is configured to house a plurality of gears between the gear housing 62 and the gear cover 64 as illustrated in FIG. 8.

Figure 5:
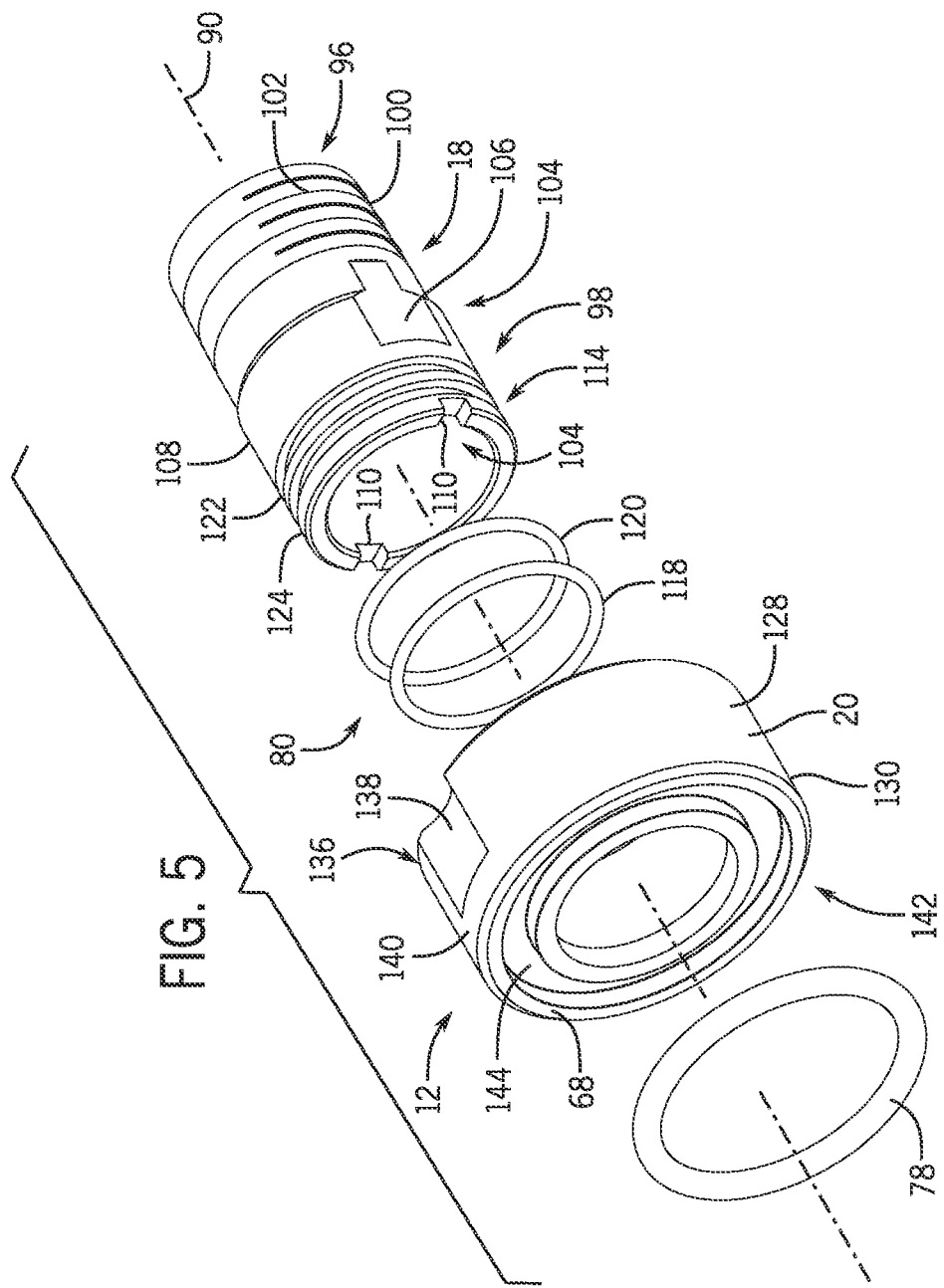
FIG. 5 is an exploded perspective view of an embodiment of the seal assembly of FIGS. 1-4, further illustrating components of the seal assembly (e.g., the conduit, radial seals, the collar, and a face seal) exploded relative to one another.

FIG. 5 is an exploded perspective view of an embodiment of the seal assembly 12 of FIGS. 1-4, further illustrating the conduit 18, the radial seals 80, the collar 20, and the face seal 78 exploded relative to one another along the central axis 90. As illustrated, the conduit 18 has the threads 102 disposed along the tapered annular surface 100 at the end portion 96, while the conduit 18 has the radial seal grooves 122 and 124 disposed along the outer conduit surface 108 at the end portion 98. The radial seal grooves 122 and 124 are part of the radial sealing interface 114 configured to seal with the collar 20. The conduit 18 also includes a plurality of the torque tool interfaces 104, such as a pair of opposing flats 106 and a pair of opposite slots 110. The radial seals 118 and 120 are configured to fit within the radial seal grooves 122 and 124. As illustrated, the radial seals 118 and 120 are annular seals, such as annular elastomeric seals, while the radial seal grooves 122 and 124 are annular seal grooves disposed in the outer conduit surface 108 (e.g., annular surface).

The collar 20 includes the axial guide 136, particularly the axial slot 138 recessed into the outer collar surface 140, such that the axial guide 136 can interface with a corresponding axial guide within the gear box assembly 28 to guide axial movement of the collar 20 relative to the conduit 18. Although, the axial guide 136 is disposed in one side of the collar 20, the collar 20 may include any number of axial guides 136 at various positions about the circumference of the collar 20. The collar 20 also includes the face seal groove 144 disposed in the axial face 68 along the end wall 130 of the collar 20. The face seal groove 144 is configured to receive the face seal 78, wherein both the face seal groove 144 and the face seal 78 may have annular shapes extending circumferentially about the central axis 90. In certain embodiments, the axial face 68 of the collar 20 may include any number of face seal grooves 144 and corresponding face seals 78.

As discussed in detail above, the radial seals 80 are configured to seal the collar 20 relative to the conduit 18 along the radial sealing interfacing 114 while also allowing relative movement between the collar 20 and the conduit 18, and the face seal 78 is configured to seal between the collar 20 and the gear cover 64 along the axial sealing interface 142. In certain embodiments, the conduit 18 and the collar 20 are made of metallic materials (e.g., stainless steel) and/or ceramic materials. Additionally, the conduit 18 and the collar 20 may include one or more coatings or surface treatments, such as wear resistant coatings, low friction coatings, corrosion resistant coatings, or any combination thereof. For example, the coatings or surface treatments may include one or more layers of carbides (e.g., tungsten carbide), diamond-like carbon (DLC) materials, tungsten disulfide, molybdenum disulfide, polytetrafluoroethylene (PTFE), or any combination thereof. The radial seals 80 and the face seal 78 may be made of resilient materials, such as one or more elastomers.

Figure 6:
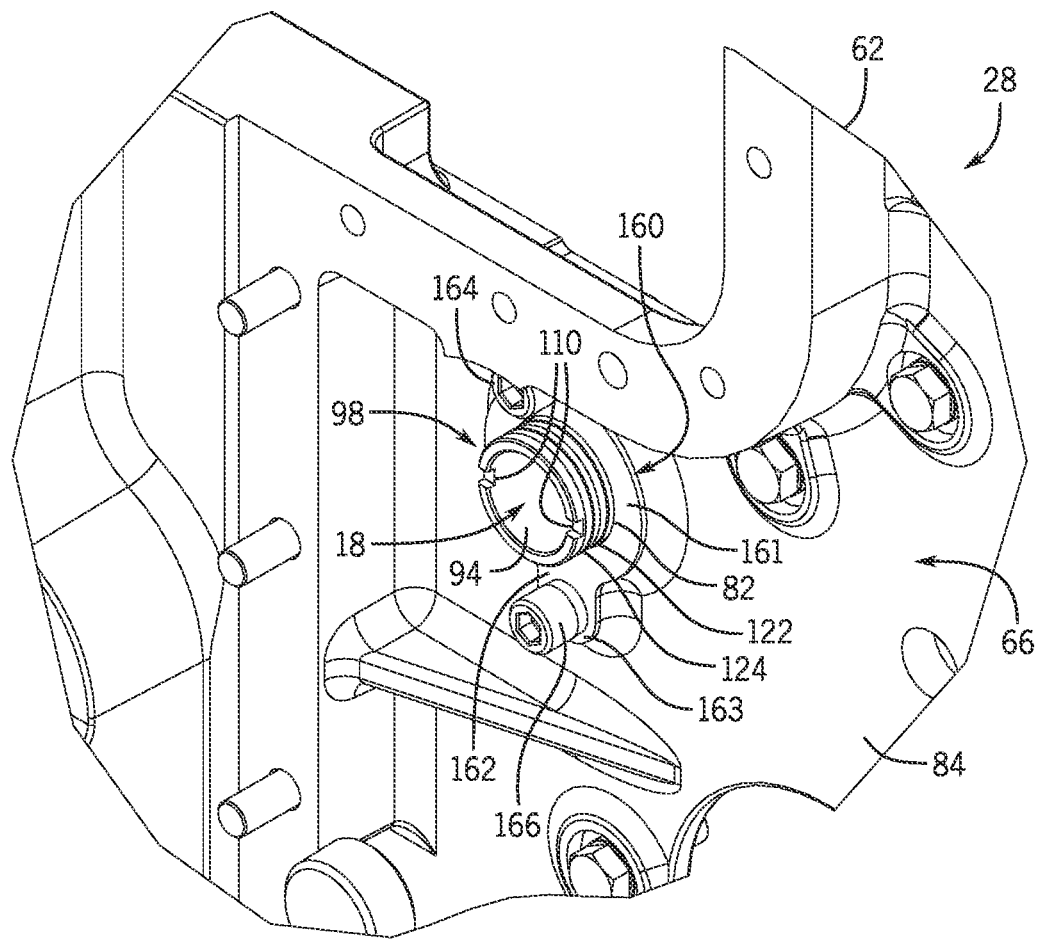
FIG. 6 is a partial perspective view of the reciprocating engine of FIG. 1, further illustrating a partial installation of the seal assembly within the gear box assembly prior to installation of a gear cover over the gear housing.

FIG. 6 is a partial perspective view of the reciprocating engine 10 of FIG. 1, further illustrating a partial installation of the seal assembly 12 within the gear box assembly 28 prior to installation of the gear cover 64 over the gear housing 62 (see FIG. 9), wherein the conduit 18 extends into the gear housing 62 and the engine block 26. As discussed above, the gear housing 62 is coupled to the engine block 26 via a plurality of fasteners (e.g., threaded fasteners or bolts), and the gasket 24 seals the interface 22 between the gear housing 62 and the engine block 26. The conduit 18 is inserted partially through the bore 82 in the wall 84 of the gear housing 62, such that the end portion 96 extends into the fluid passage 14 in the engine block 26. The threads 102 along the tapered annular surface 100 at the end portion 96 of the conduit 18 are threaded into corresponding threads in the fluid passage 14 in the engine block 26. As illustrated in FIG. 6, the end portion 98 axially protrudes from the wall 84 of the gear housing 62 after threading the conduit 18 into the fluid passage 14 in the engine block 26. The end portion 98 of the conduit 18 has the radial seal grooves 122 and 124 exposed within the gear chamber 66 of the gear housing 62. During installation, the flats 106 and/or the slots 110 of the torque tool interfaces 104 may be engaged by a torque tool to rotate the conduit 18 and drive the threads 102 into the corresponding threads in the fluid passage 14. The conduit 18 may be rotated until the threads 102 are driven sufficiently into the corresponding threads in the fluid passage 14 and/or the torque indicated at the torque tool (e.g., via a torque gauge) reaches a threshold level as the tapered annular surface 100 gradually wedges into the fluid passage 14. At this point, the collar 20 may be installed over the end portion 98 of the conduit 18.

As illustrated in FIG. 6, the conduit 18 is disposed through the bore 82 in the wall 84 in a recessed area 160 of the gear housing 62. In certain embodiments, the recessed area 160 is a cut-out portion of the gear housing 62, such as a portion of metal machined away from an existing gear housing 62. The cut-out portion (or machined away portion) may correspond to a border 162 surrounding the bore 82, wherein the border 162 is substantially reduced in thickness via the machining. For example, the border 162 may extend completely around the bore 82 and may include fastener receptacles for fasteners 164 and 166, such as threaded fasteners or bolts, which extend through the wall 84 and couple to the engine block 26. In the illustrated embodiment, the border 162 includes an annular shaped portion 161 and one or more branch portions 163 extending away from the annular shaped portion 161. The fasteners 164 and 166 may extend through one or both of the portions 161 and 163. In the illustrated embodiment, the fastener 164 extends through a fastener receptacle in the annular shaped portion 161, while the fastener 166 extends through a fastener receptacle in the branch portion 163.

Prior to the machining, the border 162 (including portions 161 and 163) may axially protrude to a distance away from the wall 84 of the gear housing 62. In other words, the recessed area 160 may have been previously protruding along the border 162, such that the fasteners 164 and 166 were raised relative to the wall 84 of the gear housing 62.

However, as part of a retrofit or new construction of the gear housing 62, the border 162 may be machined away to create the recessed area 160 about the bore 82. In certain embodiments, the machining at the border 162 may reduce the distance by at least 50, 60, 70, 80, 90, 95, or 100 percent. For example, the machining may result in the border 162 being flush with the adjacent surface of the wall 84 of the gear housing 62.

As illustrated, the fasteners 164 and 166 protrude outwardly away from the wall 84 at the border 162 around the bore 82 within the recessed area 160. As discussed in further detail below, one or more of the fasteners 164 and 166 may engage with a corresponding axial guide 136 in the collar 20 to facilitate axial guiding of the collar 20 relative to the conduit 18. Accordingly, the fasteners 164 and 166 may also be described as mating axial guides configured to slide along the axial slots 138 of the axial guides 136 in the collar 20. In some embodiments, the mating axial guides may be fixed protrusions in the wall 84 of the gear housing 62, rather than the fasteners 164 and/or 166.

Figure 7:
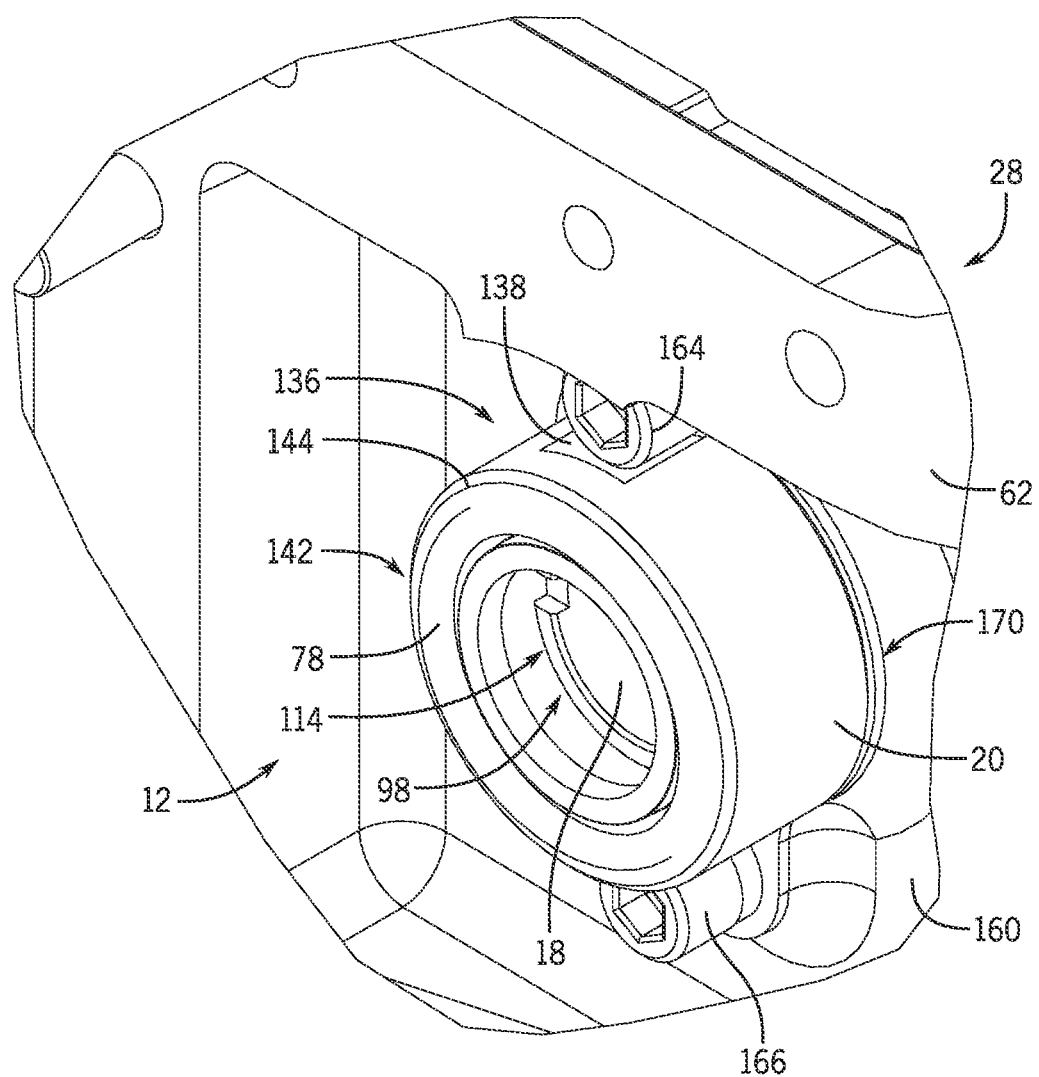
FIG. 7 is a partial perspective view of the reciprocating engine of FIGS. 1 and 6, further illustrating a full installation of the seal assembly within the gear box assembly prior to installation of the gear cover over the gear housing.

FIG. 7 is a partial perspective view of the reciprocating engine 10 of FIGS. 1 and 6, further illustrating a full installation of the seal assembly 12 within the gear box assembly 28 prior to installation of a gear cover 64 over the gear housing 62. As illustrated, the collar 20 is disposed circumferentially about the end portion 98 of the conduit 18 along the radial sealing interface 114. The collar 20 includes the face seal 78 disposed in the face seal groove 144 to facilitate sealing with the gear cover 64 along the axial sealing interface 142. Additionally, the collar 20 includes the axial slot 138 of the axial guide 136 mating with the fastener 164, which also serves as a mating axial guide. Additionally, the collar 20 may include the axial slot 138 of the axial guide 136 engaged with the fastener 166 (e.g., mating axial guide) on an opposite side of the collar 20. The interconnection between the axial slot 138 of the axial guide 136 and the fastener 164 and/or the fastener 166 is configured to guide the collar 20 to move in an axial direction relative to the conduit 18 when providing for relative axial movement along the distance 126 as discussed above with reference to FIG. 3. The face seal 78 along the axial sealing interface 142 is configured to seal between the collar 20 and the gear cover 64 upon installation of the gear cover 64 onto the gear housing 62. In certain embodiments, the seal assembly 12 may further include one or more springs 170 disposed about the conduit 18 between the collar 20 and the wall 84 of the gear housing 62, thereby biasing the collar 20 and the face seal 78 in an axial direction toward the gear cover 64 to facilitate sealing along the axial sealing interface 142. For example, the one or more springs 170 may include annular springs, such as spring washers, helical springs, or a combination thereof.

FIG. 8 is a front view of an embodiment of the reciprocating engine 10 of FIG. 1, further illustrating the seal assembly 12 disposed in the gear box assembly 28 mounted to the engine block 26, prior to installation of the gear cover 64 over the gear housing 62. In the illustrated embodiment, the gear box assembly 28 may include a gear assembly 180 (e.g., gear train) including a gear 182, a gear 184, a gear 186, and a gear 188. The gear 182 may be a crank gear coupled to the crankshaft 42, such that the gear 182 is configured to rotate in response to reciprocating motion of the pistons 38 in the piston cylinder assemblies 36. The gear 184 may be a pump gear configured to be driven by the gear 182 to drive the pump 34 as discussed above with reference to FIG. 1. For example, the gear 184 may be a pump idler gear, which couples to and drives a main pump gear of the pump 34. The gear 186 may be configured to transfer rotational motion from the gear 182 to the gear 188. For example, the gear 186 may be an idler gear configured to be driven by the gear 182 and change the rotational direction of rotation for driving the gear 188. The gear 188 may be a cam gear configured to rotate a cam shaft to operate various valves (e.g., intake and exhaust valves) in the cylinder heads 30 of the reciprocating engine 10. Accordingly, the gear box assembly 28 includes the gear assembly 180 in the gear chamber 66 between the gear housing 62 and the gear cover 64. Thus, the gear chamber 66 includes both the gear assembly 180 and also the seal assembly 12 as discussed above.

Figure 9:
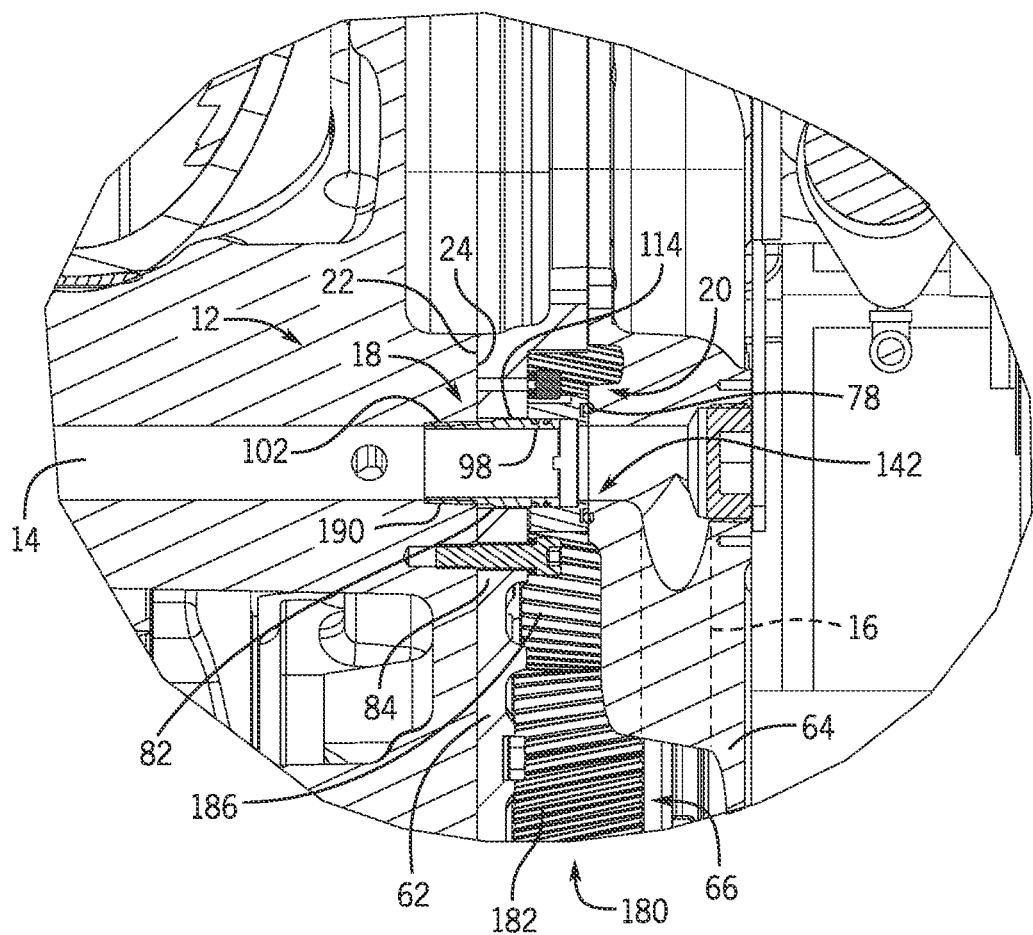
FIG. 9 is a partial cross-sectional side view of the reciprocating engine of FIG. 1, further illustrating the seal assembly disposed between the fluid passage in the engine

FIG. 9 is a partial cross-sectional side view of the reciprocating engine 10 of FIG. 1 at the interface 22, further illustrating the seal assembly 12 disposed between the fluid passage 14 in the engine block 26 and the fluid passage 16 in the gear box assembly 28, after installation of the gear cover 64 over the gear housing 62. As further illustrated in FIG. 9, the gear chamber 66 of the gear box assembly 28 includes the gear assembly 180 and at least a portion of the seal assembly 12, particularly the end portion 98 of the conduit 18 and the collar 20. The threads 102 of the conduit 18 are threaded into corresponding threads 190 in the fluid passage 14. The conduit 18 extends through the bore 82 in the wall 84 of the gear housing 62. The end portion 98 of the conduit 18 extends into the gear chamber 66 and is surrounded by the collar 20 along the radial sealing interface 114. The collar 20 also has the face seal 78 disposed against the gear cover 64 along the axial sealing interface 142. In operation, the conduit 18 seals with the fluid passage 14 at the threaded connection of threads 102 and 190, the conduit 18 blocks fluid leakage in a radial outward direction at the interface 22 having the gasket 24, the collar 20 seals about the conduit 18 at the radial sealing interface 114, and the collar 20 seals with the gear cover 64 at the axial sealing interface 142.

Technical effects of the disclosed embodiments include improved sealing at the interface 22 having the gasket 24 between components of the reciprocating engine 10 (e.g., the engine block 26 and the gear box assembly 28). Accordingly, the seal assembly 12 may be mounted at the interface 22 having the gasket 24, wherein the conduit 18 of the seal assembly 12 extends directly across the interface 22 between the components (e.g., 26 and 28) and the corresponding fluid passages (e.g., 14 and 16). The conduit 18 blocks fluid leakage directly at the interface 22, such that the gasket 24 is better protected from the fluid flow and less likely to leak. The seal assembly 12 also includes the collar 20 disposed circumferentially about the conduit 18 at the radial sealing interface 114 having one or more radial seals 80. The radial seals 80 (e.g., elastomeric O-rings) block fluid leakage between the conduit 18 and the collar 20, while also enabling relative axial movement between the collar 20 and the conduit 18. The collar 20 further includes the axial sealing interface 142 having one or more face seals 78 configured to seal the axial face 68 of the collar 20 against the opposing axial face 70 of the component of the reciprocating engine 10 (e.g., the gear cover 64 of the gear box assembly 28). In some embodiments, one or more springs 170 may bias the collar 20 against the opposing axial face 70 of the component (e.g., the gear cover 64). The seal assembly 12 may be part of a retrofit kit configured to enhance sealing in the reciprocating engine 10. As an example of the retrofit kit, the seal assembly 12 may be provided alone or in combination with all or part of the gear box assembly 28 designed to accommodate the seal assembly 12. Thus, the seal assembly 12 improves sealing, protects the gasket 24, and reduces the possibility of downtime of the reciprocating engine 10 due to fluid leakages.

The subject matter described in detail above may be defined by one or more clauses, as set forth below.

In certain embodiments, a system includes a seal assembly configured to mount between a first passage of an engine block and a second passage of a gear box assembly of a reciprocating engine. The seal assembly includes a conduit having a first end portion configured to be disposed inside of the first fluid passage and a second end portion configured to be disposed outside of the first fluid passage in fluid communication with the second passage of the gear box assembly. The seal assembly includes a collar disposed about the second end portion of the conduit. The seal assembly includes a radial sealing interface disposed between an outer conduit surface of the conduit and an inner collar surface of the collar, wherein the radial sealing interface is configured to support a first radial seal. The seal assembly includes an axial sealing interface disposed between an axial face of the collar and an opposing axial face of the gear box assembly, wherein the axial sealing interface is configured to support a face seal.

The system of the preceding claim, wherein the collar and the conduit are configured to move axially relative to one another over an axial distance along the radial sealing interface.

The system of any preceding claim, wherein the axial distance is at least 1, 2, 3, 4, 5, 6, 7, 8, 9, 10, or more millimeter.

The system of any preceding claim, wherein the first end portion has threads configured to couple with mating threads in the first fluid passage.

The system of any preceding claim, wherein the first end portion has a tapered annular surface having the threads.

The system of any preceding claim, wherein the conduit has at least one torque tool interface.

The system of any preceding claim, wherein the at least one torque tool interface has one or more flats disposed on the outer conduit surface of the conduit, one or more slots on an axial surface of the conduit, or a combination thereof.

The system of any preceding claim, wherein the radial sealing interface is configured to support a second radial seal.

The system of any preceding claim, including the first radial seal, the second radial seal, and the face seal.

The system of any preceding claim, wherein the conduit and the collar are metallic, wherein the first radial seal, the second radial seal, and the face seal are elastomeric.

The system of any preceding claim, wherein the radial sealing interface has a first seal groove in the outer conduit surface of the conduit, and the first seal groove is configured to support the first radial seal.

The system of any preceding claim, wherein the axial sealing interface has a face seal groove in the axial face of the collar, and the face seal groove is configured to support the face seal.

The system of any preceding claim, wherein the radial sealing interface is annular, the first radial seal is annular, and the face seal is annular.

The system of any preceding claim, wherein the collar has an axial guide configured to interface with a mating axial guide.

The system of any preceding claim, including a gear housing of the gear box assembly, wherein the gear housing includes a recessed area having a bore in a housing wall, the conduit is configured to extend through the bore such that the first and second end portions protrude from opposite sides of the housing wall, and the collar is configured to mount in the recessed area about the second end portion of the conduit.

The system of any preceding claim, wherein the gear box assembly has a plurality of gears disposed between a gear housing and a gear cover, the gear housing is coupled to the engine block, the gear cover is coupled to the gear housing, and the gear cover has the opposing axial face.

The system of any preceding claim, including the reciprocating engine having the seal assembly.

The system of any preceding claim, wherein the first and second fluid passages are configured to circulate a lubricant in the reciprocating engine.

In certain embodiments, a method includes forming a conduit of a seal assembly, wherein a first end portion of the conduit is configured to be disposed inside of a first fluid passage of an engine block of a reciprocating engine, wherein a second end portion of the conduit is configured to be disposed outside of the first fluid passage in fluid communication with a second passage of a gear box assembly of the reciprocating engine. The method includes forming a collar of the seal assembly, wherein the collar is configured to be disposed about the second end portion of the conduit. The method includes forming a radial sealing interface between an outer conduit surface of the conduit and an inner collar surface of the collar, wherein the radial sealing interface is configured to support a first radial seal. The method includes forming an axial sealing interface between an axial face of the collar and an opposing axial face of the gear box assembly, wherein the axial sealing interface is configured to support a face seal.

In certain embodiments, a method includes sealing, via a seal assembly, between a first passage of an engine block and a second passage of a gear box assembly of a reciprocating engine. The seal assembly includes a conduit having a first end portion disposed inside of the first fluid passage and a second end portion disposed outside of the first fluid passage in fluid communication with the second passage of the gear box assembly. The seal assembly includes a collar disposed about the first radial seal along the second end portion of the conduit. The seal assembly includes a radial sealing interface disposed between an outer conduit surface of the conduit and an inner collar surface of the collar, wherein the radial sealing interface is configured to support a first radial seal. The seal assembly includes an axial sealing interface disposed between an axial face of the collar and an opposing axial face of the gear box assembly, wherein the axial sealing interface is configured to support a face seal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
   a seal assembly configured to mount between a first passage of an engine block and a second passage of a gear box assembly of a reciprocating engine, wherein the seal assembly comprises:

a conduit having a first end portion configured to be disposed inside of the first fluid passage and a second end portion configured to be disposed outside of the first fluid passage in fluid communication with the second passage of the gear box assembly;

a collar disposed about the second end portion of the conduit;

a radial sealing interface disposed between an outer conduit surface of the conduit and an inner collar surface of the collar, wherein the radial sealing interface is configured to support a first radial seal; and an axial sealing interface disposed between an axial face of the collar and an opposing axial face of the gear box assembly, wherein the axial sealing interface is configured to support a face seal.

2. The system of claim 1, wherein the collar and the conduit are configured to move axially relative to one another over an axial distance along the radial sealing interface.

3. The system of claim 2, wherein the axial distance is at least 5 millimeter.

4. The system of claim 1, wherein the first end portion comprises threads configured to couple with mating threads in the first fluid passage.

5. The system of claim 2, wherein the first end portion comprises a tapered annular surface having the threads.

6. The system of claim 1, wherein the conduit comprises at least one torque tool interface.

7. The system of claim 6, wherein the at least one torque tool interface comprises one or more flats disposed on the outer conduit surface of the conduit, one or more slots on an axial surface of the conduit, or a combination thereof.

8. The system of claim 1, wherein the radial sealing interface is configured to support a second radial seal.

9. The system of claim 8, comprising the first radial seal, the second radial seal, and the face seal.

10. The system of claim 9, wherein the conduit and the collar are metallic, wherein the first radial seal, the second radial seal, and the face seal are elastomeric.

11. The system of claim 1, wherein the radial sealing interface comprises a first seal groove in the outer conduit surface of the conduit, and the first seal groove is configured to support the first radial seal.

12. The system of claim 1, wherein the axial sealing interface comprises a face seal groove in the axial face of the collar, and the face seal groove is configured to support the face seal.

13. The system of claim 1, wherein the radial sealing interface is annular, the first radial seal is annular, and the face seal is annular.

14. The system of claim 1, wherein the collar comprises an axial guide configured to interface with a mating axial guide.

15. The system of claim 1, comprising a gear housing of the gear box assembly, wherein the gear housing comprises a recessed area having a bore in a housing wall, the conduit is configured to extend through the bore such that the first and second end portions protrude from opposite sides of the housing wall, and the collar is configured to mount in the recessed area about the second end portion of the conduit.

16. The system of claim 1, wherein the gear box assembly comprises a plurality of gears disposed between a gear housing and a gear cover, the gear housing is coupled to the engine block, the gear cover is coupled to the gear housing, and the gear cover comprises the opposing axial face.

17. The system of claim 1, comprising the reciprocating engine having the seal assembly.

18. The system of claim 1, wherein the first and second fluid passages are configured to circulate a lubricant in the reciprocating engine.

19. A method, comprising:
forming a conduit of a seal assembly, wherein a first end portion of the conduit is configured to be disposed inside of a first fluid passage of an engine block of a reciprocating engine, wherein a second end portion of the conduit is configured to be disposed outside of the first fluid passage in fluid communication with a second passage of a gear box assembly of the reciprocating engine;

forming a collar of the seal assembly, wherein the collar is configured to be disposed about the second end portion of the conduit;

forming a radial sealing interface between an outer conduit surface of the conduit and an inner collar surface of the collar, wherein the radial sealing interface is configured to support a first radial seal; and forming an axial sealing interface between an axial face of the collar and an opposing axial face of the gear box assembly, wherein the axial sealing interface is configured to support a face seal.

20. A method, comprising:
sealing, via a seal assembly, between a first passage of an engine block and a second passage of a gear box assembly of a reciprocating engine, wherein the seal assembly comprises:

a conduit having a first end portion disposed inside of the first fluid passage and a second end portion disposed outside of the first fluid passage in fluid communication with the second passage of the gear box assembly;

a collar disposed about the first radial seal along the second end portion of the conduit;

a radial sealing interface disposed between an outer conduit surface of the conduit and an inner collar surface of the collar, wherein the radial sealing interface is configured to support a first radial seal; and an axial sealing interface disposed between an axial face of the collar and an opposing axial face of the gear box assembly, wherein the axial sealing interface is configured to support a face seal.

* * * * *